B. KUHNS.

GRAIN-DRILL.

No. 7,709. Reissued May 29, 1877.

Attest

Herman Herrett

John O. Sula

Inventor

Benjamin Kuhns

By Wood & Boyd

His Attys.

N. PETERS, PHOTO-LITHOGRAPHER, WASHINGTON, D. C.

UNITED STATES PATENT OFFICE.

BENJAMIN KUHNS, OF DAYTON, OHIO.

IMPROVEMENT IN GRAIN-DRILLS.

Specification forming part of Letters Patent No. 116,719, dated July 4, 1871; reissue No. 5,432, dated June 3, 1873; reissue No. 7,709, dated May 29, 1877; application filed February 5, 1876.

*To all whom it may concern:*

Be it known that I, BENJAMIN KUHNS, of Dayton, in the county of Montgomery and State of Ohio, have invented a certain Improvement in Grain-Drills; and I do hereby declare that the following is a full, clear, and exact description thereof, reference being had to the annexed drawing, making part of this specification, in which—

Figure 1:
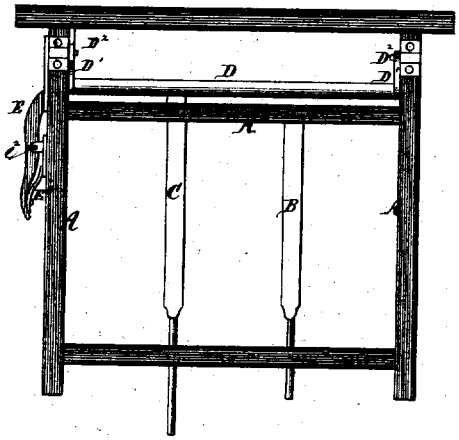
Figure 2:
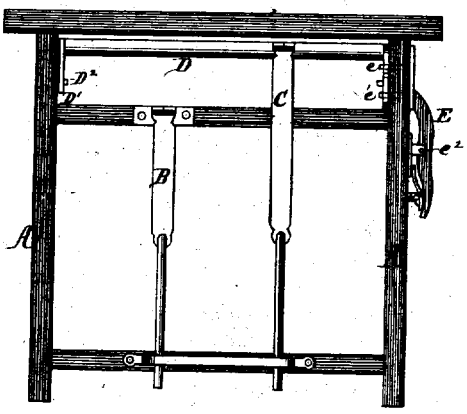
Figure 3:
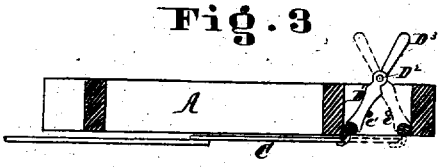

Figure 1 is a plan view of so much of the frame of a grain-drill as is necessary to illustrate my invention. Fig. 2 is a bottom view thereof. Fig. 3 is a longitudinal section.

The same letters are used in all the figures in the designation of identical parts.

This invention relates to that class of grain-drills in which the hoes are changeable from single-file to double-file, and vice versa.

The object of my invention is to provide an oscillating bar, to which each alternate hoe is attached, that will occupy the same horizontal position whether the hoes be in single or double rank, so that the depth of furrow made by changeable hoes will always be the same; and consists in hinging the movable drag-bars to a swinging bar, which is suspended at each end by pivots fixed on arms which project above the main frame, and pivoting into standards at a sufficient distance above the frame to allow the bar to be in the same horizontal plane whether thrown to the front or rear; and my invention also consists in providing studs, which play through apertures in the frame, to hold the bar in one position or the other, as will be generally explained in the following description.

In the annexed drawing, A refers to the frame-work of a grain-drill, constructed with a cross-beam, A′, to which the stationary drag-bars B, carrying the stationary hoes, are hinged.

Every alternate one of the drag-bars is movable, and those marked C are hinged to a bar, D, located in front of the beam A′. This bar extends from side to side of the frame, between its longitudinal beams, and has an arm, $D^1$, at each end, by means of which it is suspended from projecting studs $D^2$, which are securely fastened to the frame.

These studs may, however, be formed on the arms of the bar and turn in suitable bearings, if preferred.

One of the arms is extended above the pivoted stud $D^2$, to form a suitable handle, $D^3$, by means of which the bar may be oscillated.

It will be understood that on drawing the machine forward, the hoes, entering the earth, will oscillate the bar D rearward as far as its arms are permitted to swing. The movement of the bar is controlled by two studs, *e* and $e^1$, which play through apertures in one of the longitudinal beams of the frame A, so that when projected the rear edge of the arm $D^1$ upon that end of the bar D will come in contact with one or the other of these studs, according to the position which the changeable hoes shall occupy with reference to the stationary ones. When the hoes are to stand in a row, the arm of the bar D is brought forward of the stud *e*; but when the hoes are arranged in a zigzag line the arm of the bar D will occupy the position shown in Fig. 3, so as to come in contact with the stud $e^1$. The studs *e* and $e^1$ form part of one arm of a lever, E, which is pivoted upon a stud, $e^2$, on the outside of the frame, so as to move in a horizontal plane.

The arm of the lever carrying the studs *e* and $e^1$ is kept in contact with the frame by means of a spring, E′, acting upon the other arm, as clearly shown in Figs. 1 and 2.

On changing the hoes from one position to the other the studs *e* and $e^1$ are temporarily withdrawn into the frame by turning the lever E.

Hinging the bar on arms $D^1$ projected above the main frame increases the leverage, and the hoes are shifted much easier than when revolving or sliding bars are used.

What I claim as my invention, and desire to secure by Letters Patent, is—

1. In combination with the oscillating bar D, to which the changeable drag-bars are hitched; and its arms $D^1$ $D^1$, the studs *e* and $e^1$, which play through the side beam of the frame, and are retracted and projected by means such as described, or equivalent means, all operating in the manner set forth.

2. In a shifter for grain-drills, the single oscillating bar D, pivoted to stud $D^2$, projecting above the main frame, and operated by the handle $D^3$, substantially as and for the purpose set forth.

3. In a grain-drill, the combination of an oscillating bar, to which a portion of the drag-bars are attached, and locking bolts or pins, arranged substantially as described, for the purpose of holding the oscillating bars in position, as set forth.

4. The stationary beam A′ and drag-bars B, in combination with the oscillating bar D, pivoted to studs $D^2$, projecting above the main frame, and the adjustable drag-bars C, substantially as and for the purpose set forth.

BENJAMIN KUHNS.

Attest:
E. E. WOOD,
JOHN O'GARA.